UNITED STATES PATENT OFFICE.

CHARLES COLCOCK JONES, OF LOS ANGELES, CALIFORNIA.

PROCESS OF EXTRACTING IRON FROM ITS ORES.

1,348,804.     Specification of Letters Patent.     Patented Aug. 3, 1920.

No Drawing.     Application filed June 19, 1916. Serial No. 104,523.

*To all whom it may concern:*

Be it known that I, CHARLES COLCOCK JONES, a citizen of the United States, residing at Los Angeles, in the county of Los Angeles and State of California, have invented certain new and useful Improvements in Processes of Extracting Iron from Its Ores, of which the following is a specification.

My invention relates to an improvement in the process of extracting iron from its ores.

The primary object of this invention is to improve the method of direct reduction of iron ore to the metallic state without fusion or smelting of the ore, and I am aware that a number of methods have been proposed with this end in view, generally dependent upon specially constructed furnaces and appliances and upon mixtures of iron ore with solid carbonaceous fuel or upon the reduction of the iron ore by the action of reducing gases produced exteriorly to the ore and conducted through or over the ore by various means, or by a combination of the two means of producing a reducing atmosphere, or dependent upon reduction of briquets of iron ore, or layers of comminuted iron ore embedded in solid carbonaceous material essentially high in ash and otherwise useless for reduction or smelting of iron ores.

My invention relates to the use of petroleum and the products or residues of petroleum, whether liquid, solid or semi-solid, in intimate mechanical mixture with finely comminuted iron ore alone, and the embedding of this mixture in the form of briquets in a surrounding body of solid carbonaceous material, or as layers between layers of solid carbonaceous material such as lignite or coal, in a suitable container to which there is no access of outside air and the subjection of said container to external heat less than fusion. By a series of tests I have found that it is not possible in a container for the purpose, similar to a closed crucible or retort, to secure a reduction of the iron to the metallic state by the volatilization of the intermixed petroleum or petroleum products alone, but that the amorphous carbon derived from the volatilization of the intermixed petroleum, or added directly as amorphous carbon residue from the distillation of petroleum in the refining of crude oils, and the making of gas from crude oils, remains to an appreciable extent in the reduced iron as a component part of it, and the retention of this carbon and its hardening into petroleum coke is due in the first place to the action of the externally applied heat before and during reduction.

The containers may be of brick or iron and the kiln in which these containers are placed to be subjected to external heat may be one of the many forms used in brick or tile burning. The external heat necessary to effect the reduction of the iron ore in the container is never great enough to fuse or melt the reduced metal or to produce a slag in the containers, and is usually below 1400° C. or below red heat.

A part of the amorphous carbon from the petroleum or petroleum products remains in the nature of an intermixed coke with the reduced iron, and my invention relates to the production of this material for use in steel making as a substitute for scrap, in the open hearth process for example, in which it would have a valuable application and is essentially different from the reduced iron produced by any other known direct method.

The purpose of the petroleum or petroleum product mixed with the iron ore is to produce an appreciable amount of amorphous solid carbon in the interstices of the reduced iron under the influence of heat applied externally to the container, crucible or retort. The purpose of the carbonaceous fuel in which the mixture of iron ore and petroleum or petroleum product is embedded or interbedded, is to help remove the oxygen from the ore under the influence of heat applied externally to the container, crucible or retort, in which the iron ore, petroleum or petroleum products with the carbonaceous fuel is held. The final product is a homogeneous agglomeration of reduced iron and carbon, which can be easily separated from any ash produced from the combustion of the carbonaceous fuel.

I claim:

1. A process of reducing iron from iron ore, which consists in mixing the iron with petroleum, embedding the mixture in solid carbonaceous fuel in containers to which air has no access, heating said containers to a temperature below the heat of fusion, but to a sufficiently high temperature to reduce the ore to a metallic state and leaving an appreciable amount of carbon in the interstices of the reduced iron derived from the petroleum, the retention of this carbon and the agglomeration of the reduced iron and such carbon being due to a coking action of the mixed petroleum during the reduction of the iron to the metallic state.

2. The method of producing a body of iron containing carbon which comprises making an intimate mixture of finely divided iron ore and petroleum, of heating said mixture in a suitable container together with carbonaceous fuel without access of air below the heat of fusion, continuing the application of the heat externally of the container until the iron ore is reduced to the metallic state and the contained amorphous carbon from the petroleum is agglomerated with the reduced iron forming a mixture of petroleum coke and iron.

In testimony whereof I affix my signature.

CHARLES COLCOCK JONES.